Sept. 13, 1960  J. M. FINN, JR., ET AL  2,952,591
ELECTROLYTIC PREPARTION OF CALCIUM CARBIDE
Filed Feb. 26, 1959
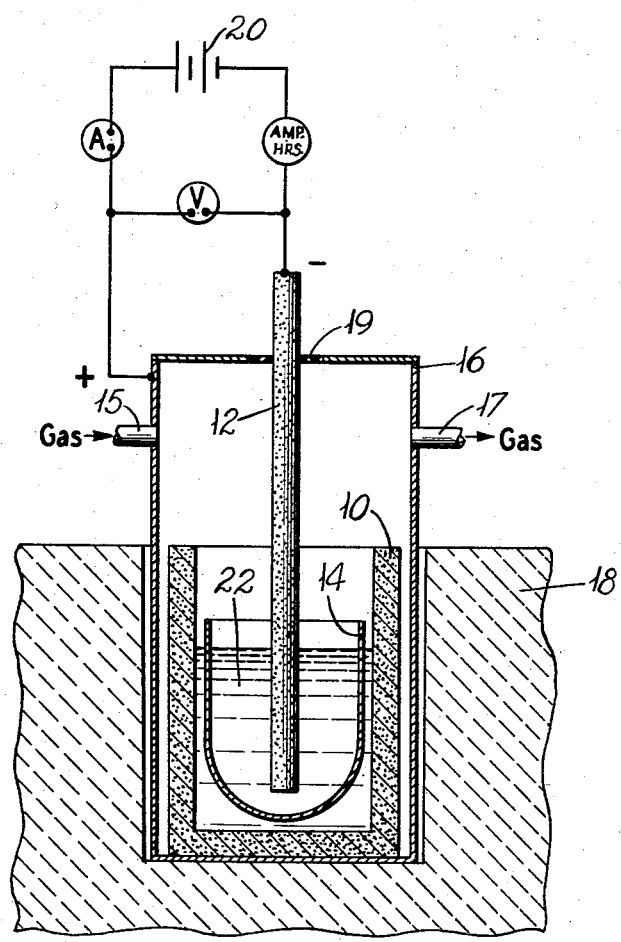
INVENTORS
JOHN M. FINN, JR.
LAWRENCE M. LITZ
MYRON N. PLOOSTER
BY *John F. Hohmann*
ATTORNEY

2,952,591
Patented Sept. 13, 1960

2,952,591
ELECTROLYTIC PREPARATION OF CALCIUM CARBIDE

John M. Finn, Jr., Cleveland, and Lawrence M. Litz, Lakewood, Ohio, and Myron N. Plooster, Plainfield, Ind., assignors to Union Carbide Corporation, a corporation of New York Filed Feb. 26, 1959, Ser. No. 795,696

15 Claims. (Cl. 204—61)

This invention relates to the preparation of calcium carbide and it more particularly relates to the preparation of calcium carbide by the electrolysis of a molten calcium salt in the presence of a source of carbon.

Calcium carbide is a very important basic chemical compound which is primarily used to make acetylene and cyanamide. At present, this compound is generally manufactured commercially by heating a mixture of lime and carbon in the intense heat of an electric arc. The heat causes the lime to be reduced by the carbon to produce the carbide. Since the demand for acetylene is constantly rising, it would be well to have another source of calcium carbide, other than that which utilizes lime as a basic reactant, in order to insure a ready supply of this useful and important compound. Further, it would be advantageous to produce calcium carbide at temperatures which are substantially lower than those employed by the electric arc process.

It is therefore the principal object of this invention to provide a new and improved process for the production of calcium carbide.

Fulfilling this object, the process of this invention comprises electrolyzing a molten salt, which contains calcium ions, in the presence of a source of carbon in an electrolytic cell. As used above and hereinafter in this disclosure and the appended claims, the term carbon is meant to encompass both graphite and non-graphitic or amorphous carbon.

As an example of the type of apparatus which may be used for the electrolysis, the accompanying figure shows an electrolytic cell adapted to use in this invention in vertical section.

With reference to the accompanying drawing, the electrolytic cell comprises a crucible 10, which serves as one electrode, preferably the anode, of the cell, a rod 12, which serves as the other electrode, preferably the cathode, and a porous insulating chemically inert separator 14. The separator should be between the anode and the cathode so as to define a relatively large cathode compartment as compared to the anode compartment. This electrolytic cell assembly is suitably contained within a corrosion resistant enclosure 16, suitably insulated from at least one of the electrodes, as shown at 19, which may have entry and exhaust ports 15 and 17 suited to maintain an inert gas atmosphere around the cell, and the enclosure 16 placed in a conventional crucible furnace 18 for heating purposes. Electrical power may be supplied by a battery or a direct current generator 20 through the enclosure 16 to one of the electrodes, or such may be supplied directly to the anode 10 and cathode 12. The electrolyte 22 is conveniently made up of a mixed salt bath. However, it may be substantially all a calcium salt provided that a suitable source of carbon is made available in the cell.

The mixed salt bath may be composed of calcium chloride, lithium chloride and calcium carbonate. These particular compounds are preferred because calcium chloride and lithium chloride form a low melting point mixture (507° C.), which may be termed a eutectic, at 63.4% calcium chloride; and the calcium carbonate, which serves as a suitable source of carbon, dissolves readily in this eutectic melt. It is desirable, but not essential, to use the eutectic proportions since lower power is required to maintain it in the molten state than is required to keep any other proportions of these salts molten. The source of carbon referred to above may be provided as a solid carbonaceous body in contact with the electrolyte in the cathode compartment. If such is used, it is preferred to employ a non-consumable cathode. Alternatively, the cathode itself may act as the source of carbon necessary to the operation of this process. This may be accomplished by providing a consumable carbon electrode as the cathode.

Conveniently, the cathode may be in the form of a rod, a cylinder or a group of either, or the crucible may be made the cathode and the central electrode the anode. However, if the crucible is made the cathode, it is preferred to make such non-consumable and to provide a source of carbon in the cell distinct and separate from the cathode. While it is possible to obtain yields of calcium carbide by any of the various electrode formations above referred to, it was found that one of the best experimental runs, that is the one with the highest current efficiency, resulted when the crucible served as the anode and a bundle of amorphous carbon rods in the center of the crucible served as the consumable cathode.

Where a chloride electrolyte is used, chlorine is the product liberated at the anode during electrolysis. If such is the situation, it is necessary that the cell components be made of a material which will not be corroded or materially affected by this gas. The chlorine produced may be collected as a useful by-product or it may conveniently be carried out of the cell with an inert flush. If suitable precautions are taken to prevent atmospheric oxidation of the cell components, an inert gas flush is not necessary in which case the chlorine may be conveniently collected as a by-product. The cell enclosure should be adapted to protect the electrolytic cell, and its contents of fused salt, from atmospheric oxidation. A nickel base alloy was chosen for use as the cell enclosure material because of its resistance to chlorine attack.

A series of tests run on the electrolysis of calcium chloride wherein the size of the anode and cathode compartment was varied by moving the separator closer to or further from the central cathode, indicated that there was a tendency for the product to decompose upon electronic or ionic contact with the anode. A layer of carbon was found to be coated upon the separator and the thickness of this layer varied with the distance that the separator was displaced from the cathode. As the cathode compartment, that is the volume defined between the separator and the cathode, became larger, the amount of deposited carbon decreased. It is thought that current yields of below 100% are primarily caused by this decomposition reaction.

Generally, the electrolysis may best be carried out by mixing between 64 and 188 parts by weight of calcium chloride with between 42 and 169 parts by weight of lithium chloride to obtain a mixture having from 18 to 72 weight percent lithium chloride. The mixture may be heated to between 507° C. and 850° C., thereby melting it, whereupon sufficient calcium carbonate should be added to obtain a weight percent concentration ratio of 1 to 4 calcium carbonate to calcium chloride in the melt. It is not necessary that the calcium chloride and lithium chloride be of any particular particle size since the mixture is subsequently melted. However, the calcium carbonate should be of a particle size sufficient to readily dissolve in the molten mixture in order that the power requirements be kept to a minimum by reducing the temperature-hold time to a minimum.

The lithium chloride-calcium chloride mixture in the proportions above noted is melted in the electrolytic cell under an inert atmosphere and 5.8 to 23 parts of the calcium carbonate added thereto. When the electrolyte has thus been formed, between 6 to 10 volts D.C. at between 7 to 20 amperes, is applied for at least 11 ampere hours. Upon completion of the electrolysis, the entire assembly is cooled in an inert atmosphere and when cool, the solid electrolysis products are removed from the cell and broken up in a dry atmosphere. The broken pieces of product are then washed with a suitable liquid, which is a solvent for the solid electrolyte but which will not dissolve or react with the calcium carbide, in order to recover the calcium carbide formed by the electrolysis. One such solvent which is caused to advantage in this leaching process, where calcium chloride and lithium chloride make up the electrolyte, is methanol. It is important in all the separation and purification steps of this process for making calcium carbide that water not be allowed to contact the product since a reaction will immediately take place therewith to form acetylene. If the ultimate aim of the process is to make acetylene, the solid electrolysis products may be directly reacted with water without any separation of the components thereof and the acetylene gas thus produced collected.

The following may be cited as specific examples of this invention:

EXAMPLE I

A mixture of 85 parts by weight of lithium chloride and 145 parts by weight of calcium chloride was made and melted at 800° C. in a graphite anode-steel cathode electrolytic cell. Finely divided calcium carbonate, in an amount of 11.5 parts by weight was dissolved in the molten mixed salt and a current of 16 amperes at 7.6 volts was passed through the cell for 24 ampere hours. After this time, the cell products were treated with water and underwent an effervescent reaction therewith. The resultant gas gas treated with ammoniacal cuprous chloride which gave a red precipitate indicating the presence of acetylene.

EXAMPLE II

About 65 parts by weight of anhydrous calcium chloride was melted at about 800° C. in a cell similar to that described in Example I except that a consumable carbon cathode was substituted for the steel cathode used in the cell described in that example, and the melt was electrolyzed with 7 to 15 amperes at 9 to 10 volts for about 2 hours. A reaction of 50 grams of the electrolysis products with water yielded about 90 cubic centimeters of a gas, about 78% of which was absorbed by ammoniacal cuprous chloride. Thus it was determined that about 0.3 part by weight of calcium carbide was formed in the 50 gram sample tested.

The results of several other similar test runs appear in Table I below. In each case, the calcium chloride electrolyte was subjected to an electrolyzing current of 10 amperes.

An analysis of the above table shows that the highest efficiency was obtained from run 3 which utilized amorphous carbon cathode rods. Comparing these results to those obtained in run 4, which had substantially the same operating conditions and cell dimensions, but which had a graphite cathode, it may be seen that the amorphous carbon serves as a better cathode. Run 5 utilized the same shape and dimension cell as was used in run 3, but this run was carried out for a much longer period. It is to be noted that while the slightly higher operating power and temperature in run 5 increased the amount of calcium carbide formed, the operating efficiency, as disclosed by the current yield, was reduced. Runs 1 and 2 show that the electrolyzing conditions may be carried and still produce calcium carbide though not as efficiently or in as great a quantity as under the conditions of runs 3 and 5. The principal difference between runs 1 and 3 was that the crucible and cathode employed in run 1 were smaller than those utilized in run 3. A comparison of the results of these two runs points out the advantage gained by using a larger electrolytic cell.

Many modifications of the apparatus hereinabove described will suggest themselves to those skilled in the art. For example, if acetylene is the desired final product, a cyclic process may be employed wherein calcium carbide is formed by the instant process and hydrolyzed to acetylene. The calcium by-product of the acetylene production may be treated to produce calcium chloride to be used in the instant process for producing calcium carbide.

Another variable in this process is the temperature. Such is limited practically by the available power and the expenditure therefor. However, any temperature from the freezing point of the electrolyte up to a temperature of excess volatilization of the electrolyte is a temperature at which the electrolysis will proceed. Therefore, any such temperature may be used in this process. Though this is generally true, a good working range has been found to be 100° C. to 150° C. above the electrolyte melting point.

While graphite has been found to be excellently suited to use as the anode of the cell described herein, other substantially inert refractory materials, as platinum for example, may also be used. So too, zirconium silicate, steel or other chemically resistant materials may be used instead of aluminum oxide for the separator material.

What is claimed is:

1. The process of making calcium carbide which comprises melting a salt bath containing a calcium salt in an electrolytic cell containing an available source of carbon, maintaining an inert gas atmosphere in said cell over said melt, electrolyzing said melt by passing a direct current therethrough, and recovering the thus produced calcium carbide therefrom.

2. The process of making calcium carbide which comprises melting a salt bath containing calcium chloride in an electrolytic cell containing a graphite anode, a consumable amorphous carbon cathode, and a chemically inert separator between such anode and cathode, maintaining an inert gas atmosphere in said cell over said melt, electrolyzing said melt by passing direct current there-

*Table I*

| Run No. | Cathode | Anode | Temp. ° C. | Volts | Amp. Hrs. | CaC₂ (gms.) | Current Yield (Percent) |
|---------|---------|-------|------------|-------|-----------|-------------|--------------------------|
| 1 | 4 carbon rods. | graphite crucible. | 790–810 | 7.0 | 15.0 | 6.3 | 35.0 |
| 2 | graphite crucible. | graphite plug. | 780–800 | 5.5 | 11.6 | 5.4 | 39.3 |
| 3 | 7 carbon rods. | graphite crucible. | 805–815 | 6.0 | 15.0 | 13.9 | 77.5 |
| 4 | graphite rod. | graphite crucible. | 810–830 | 6.0 | 15.0 | 5.6 | 31.0 |
| 5 | 7 carbon rods. | graphite crucible. | 820–850 | 7.5 | 38.6 | 20.8 | 45.2 | through, and recovering the thus produced calcium carbide.

3. The process of making calcium carbide which comprises melting a salt bath containing calcium chloride at a temperature between 507° C. and 850° C. in an electrolytic cell containing a consumable carbon cathode, a carbon anode and an aluminum oxide separator therebetween, maintaining an inert gas atmosphere in said cell over said melt, electrolyzing said melt by passing a direct current therethrough, and recovering the thus produced calcium carbide.

4. The process of making calcium carbide which comprises melting a mixture of lithium chloride, calcium chloride and calcium carbonate in an electrolytic cell containing a cathode, a carbon anode and a source of consumable carbon, maintaining an inert gas atmosphere in said cell over said melt, electrolyzing said melt by passing a direct current therethrough, and recovering the thus produced calcium carbide therefrom.

5. The process of making calcium carbide which comprises melting a mixture of lithium chloride, calcium chloride, and calcium carbonate at a temperature between 507° C. and 850° C. in an electrolytic cell containing a graphite anode, a consumable amorphous carbon cathode and an aluminum oxide separator therebetween, maintaining an inert gas atmosphere in said cell over said melt, electrolyzing said melt by passing a direct current therethrough, and recovering the thus produced calcium carbide therefrom.

6. The process of making calcium carbide which comprises melting a mixture of lithium chloride, calcium chloride and calcium carbonate at a temperature between 507° C. and 850° C. in an electrolytic cell containing a graphite anode, a steel cathode, an aluminum oxide separator therebetween, and a source of consumable carbon between said cathode and said separator, maintaining an argon atmosphere in said cell over said melt, electrolyzing said melt by passing a direct current therethrough, and recovering the thus produced calcium carbide therefrom.

7. The process of making calcium carbide which comprises melting calcium chloride, electrolyzing such with a direct current passed through said melt between a consumable carbon cathode and a carbon anode, and recovering the thus produced calcium carbide.

8. The process of making calcium carbide which comprises melting a mixture of 64 to 188 parts by weight calcium chloride, 42 to 169 parts by weight lithium chloride, and 5.8 to 23 parts by weight calcium carbonate in an electrolytic cell containing a consumable carbon cathode and a carbon anode, maintaining an inert gas atmosphere in said cell over said melt, electrolyzing said melt by passing a direct current therethrough, and recovering the thus produced calcium carbide.

9. The process of making calcium carbide which comprises melting a mixture of 64 to 188 parts by weight calcium chloride, 42 to 169 parts by weight lithium chloride, and 5.8 to 23 parts by weight calcium carbonate at a temperature between 507° C. and 850° C. in an electrolytic cell containing a graphite anode, a consumable amorphous carbon cathode and an aluminum oxide separator between such anode and cathode, maintaining an inert gas atmosphere in said cell over said melt, electrolyzing said melt by passing a direct current therethrough, and recovering the thus produced calcium carbide.

10. The process of making calcium carbide which comprises melting a mixture of 145 parts by weight calcium chloride, 85 parts by weight lithium chloride, and 11.5 parts by weight calcium carbonate at a temperature between 507° C. and 850° C. in an electrolytic cell containing a graphite anode, a consumable amorphous carbon cathode, and an aluminum oxide separator between such anode and cathode, maintaining an argon atmosphere in said cell over said melt, electrolyzing said melt by passing a direct current therethrough, and recovering the thus produced calcium carbide.

11. The process of making calcium carbide which comprises melting a salt bath containing a calcium salt in an electrolytic cell containing an available source of carbon, maintaining an inert gas atmosphere in said cell over said melt, electrolyzing said melt by passing a direct current therethrough, cooling the electrolysis product and recovering calcium carbide therefrom by leaching the solid electrolysis product with a non-aqueous solvent.

12. The process of making calcium carbide which comprises melting a salt bath containing a calcium salt in an electrolytic cell containing an available source of carbon, maintaining an inert gas atmosphere in said cell over said melt, electrolyzing said melt by passing a direct current therethrough, cooling the electrolysis product and recovering calcium carbide therefrom by leaching the solid electrolysis product with a non-aqueous solvent for said calcium salt.

13. The process of making calcium carbide which comprises melting a salt bath containing a calcium salt in an electrolytic cell containing an available source of carbon, maintaining an inert gas atmosphere in said cell over said melt, electrolyzing said melt by passing a direct current therethrough, cooling the electrolysis product and recovering calcium carbide therefrom by leaching the solid electrolysis product with a non-aqueous solvent for said calcium carbide.

14. The process of making calcium carbide which comprises melting a salt bath containing a calcium salt in an electrolytic cell containing an available source of carbon, maintaining an inert gas atmosphere in said cell over said melt, electrolyzing said melt by passing a direct current therethrough, cooling the electrolysis product and recovering calcium carbide therefrom by leaching the solid electrolysis product with methanol.

15. The process of making acetylene which comprises melting a salt bath containing a calcium salt in an electrolytic cell containing an available source of carbon, maintaining an inert gas atmosphere in said cell over said melt, electrolyzing said melt by passing a direct current therethrough, cooling the product of said electrolysis, reacting such with water, and collecting the thus produced acetylene.

References Cited in the file of this patent

UNITED STATES PATENTS

| | | |
|---|---|---|
| 785,961 | Lyons et al. | Mar. 28, 1905 |
| 1,795,512 | Schmidt et al. | Mar. 10, 1931 |
| 2,344,859 | Fox | Mar. 21, 1944 |
| 2,707,168 | Wainer et al. | Apr. 26, 1955 |
| 2,741,587 | Sindeband | Apr. 10, 1956 |

OTHER REFERENCES

Andrieux: Revue de Metallurgie, vol. 45, Nos. 1 and 2 (1948), pp. 57–58.